(12) United States Patent
Lin et al.

(10) Patent No.: US 8,352,666 B2
(45) Date of Patent: Jan. 8, 2013

(54) SIGNAL TRANSMISSION INTERFACE AND DIGITAL BROADCAST RECEIVING DEVICE

(75) Inventors: Tzu-Ping Lin, Taipei Hsien (TW); Chih-Hsiang Peng, Taipei Hsien (TW); Jui-Hsiang Chou, Taipei Hsien (TW); Cheng-Hsiung Hsu, Taipei Hsien (TW); Chih-Feng Chang, Taipei Hsien (TW)

(73) Assignee: Wistron NeWeb Corp., Hsichih, Taipei Hsien (TW)

( * ) Notice: Subject to any disclaimer, the term of this patent is extended or adjusted under 35 U.S.C. 154(b) by 502 days.

(21) Appl. No.: 12/608,242

(22) Filed: Oct. 29, 2009

(65) Prior Publication Data

US 2010/0306443 A1 Dec. 2, 2010

(30) Foreign Application Priority Data

May 27, 2009 (TW) ................................ 98117730 A

(51) Int. Cl.
*G06F 13/20* (2006.01)
(52) U.S. Cl. ........................ 710/313; 710/305; 370/363
(58) Field of Classification Search .................. 710/313, 710/100, 305–306; 370/363
See application file for complete search history.

(56) References Cited

U.S. PATENT DOCUMENTS

2007/0228139 A1 10/2007 Wang et al.
2009/0300243 A1* 12/2009 Chao ............................. 710/71

* cited by examiner

*Primary Examiner* — Brian Misiura
*Assistant Examiner* — Kim Huynh
(74) *Attorney, Agent, or Firm* — Panitch Schwarze Belisario & Nadel LLP

(57) ABSTRACT

A signal transmission interface includes: a USB audio format encoding unit adapted to be coupled to a digital broadcast receiving end, for converting a digital audio signal that originates from the digital broadcast receiving end into a USB audio signal; a USB hub coupled to the USB audio format encoding unit and adapted to be coupled to a host end, for transmitting the USB audio signal to the host end and receiving a USB control signal that originates from the host end; and a USB/serial transmission bus bridge unit coupled to the USB hub and adapted to be coupled to the digital broadcast receiving end, for converting the USB control signal that is transmitted from the USB hub into a serial transmission bus control signal, and transmitting the serial transmission bus control signal to the digital broadcast receiving end.

15 Claims, 2 Drawing Sheets

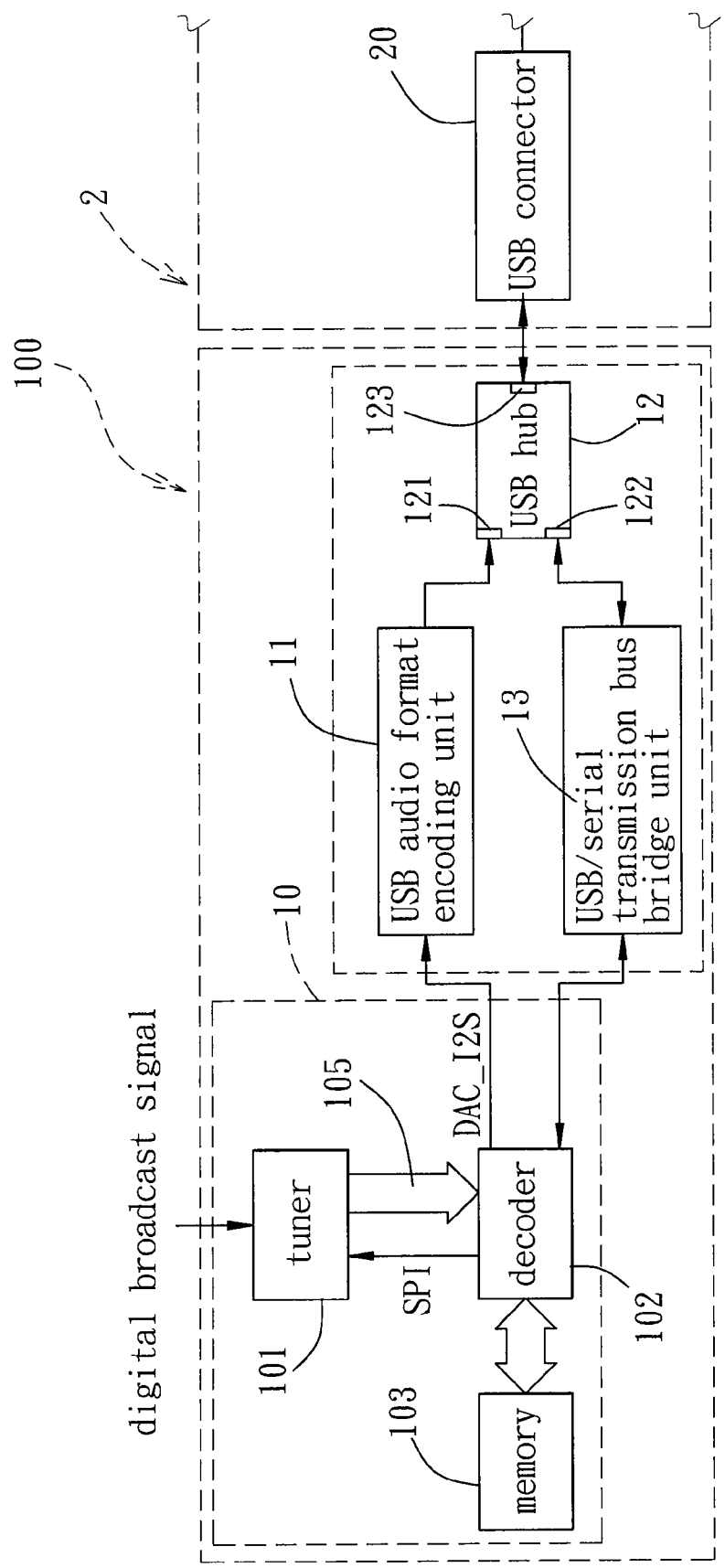
F I G. 1

| pin | descriptor | type | use |
|---|---|---|---|
| 1 | 5VIN | power | 5V power in |
| 2 | DP | I/O | USBD+ signal |
| 3 | DM | I/O | USBD− signal |
| 4 | GND | power | ground |

FIG. 2

SIGNAL TRANSMISSION INTERFACE AND DIGITAL BROADCAST RECEIVING DEVICE

CROSS-REFERENCE TO RELATED APPLICATION

This application claims priority of Taiwanese application no. 098117730, filed on May 27, 2009.

BACKGROUND OF THE INVENTION

1. Field of the Invention

This invention relates to a signal transmission interface, more particularly to a signal transmission interface of a digital broadcast receiving device.

2. Description of the Related Art

A digital broadcast system is a type of broadcast system, such as a conventional HD Radio product, that uses digital compression and transmission technologies to transmit a digital audio signal. The digital broadcast system enables reproduction of original sound subsequent to receipt of the digital audio signal by a digital broadcast receiver. Compared with conventional analog FM and AM broadcast signals, a digital broadcast signal is less prone to interference during a process of transmission that can result in loss of fidelity. The following merits are attributable to digital broadcasting.

(1) Digital broadcasting provides increased resistance to interference, and is less prone to signal attenuation during transmission. As long as the digital audio signal is received, the original sound can be broadcast with fidelity.

(2) Although transmitting power is low, audio quality of transmission attains CD quality, thereby fulfilling high sound quality requirements for music.

(3) Movement of the digital broadcast receiver at a high speed does not adversely affect reception. Moreover, a digital broadcast network can operate as a "single frequency network", which eliminates a need to change channel frequencies in order to tune in to all area programs and inconvenience associated with seeking an analog channel frequency.

(4) The utilization efficiency of the frequency spectrum is increased such that six CD quality stereo programs can be transmitted simultaneously. Moreover, non-audio digital service information can be transmitted at the same time as the digital audio signal, the non-audio digital service information being provided to a digital broadcast receiver of a display device for displaying pictures and text.

On account of these merits, application of the digital broadcast receiver in cars and homes is an increasing trend. However, integration of the digital broadcast receiver with portable media players (PMP), home sound systems, and other such consumer audio products currently requires a board connector having at least twenty-one pins, and the relatively large size of this board connector prevents easy integration of the digital broadcast receiver with these consumer audio products. Therefore, it is desired to provide a signal transmission interface for a digital broadcast receiver that is universal and has a reduced pin count so as to facilitate integration of the digital broadcast receiver with the consumer audio products.

SUMMARY OF THE INVENTION

Therefore, an object of the present invention is to provide a signal transmission interface that is simplified and universal, and a digital broadcast receiving device applying the signal transmission interface.

According to the present invention, there is provided a digital broadcast receiving device adapted for receiving a digital broadcast signal, and accepting control from a USB control signal of a host end. The digital broadcast receiving device includes a digital broadcast receiving unit and a signal transmission interface.

The digital broadcast receiving unit is adapted for receiving the digital broadcast signal and demodulating the digital broadcast signal so as to obtain a digital audio signal included therein.

The signal transmission interface is a USB interface, which converts the digital audio signal into a USB audio signal and then transmits the USB audio signal to the host end, and converts the USB control signal into a serial transmission bus control signal that is supported by the digital broadcast receiving unit and then outputs the serial transmission bus control signal to the digital broadcast receiving unit. The digital broadcast receiving unit performs frequency selection and demodulation of the digital broadcast signal based on the serial transmission bus control signal.

The signal transmission interface comprises a USB audio format encoding unit, a USB hub, and a USB/serial transmission bus bridge unit.

The USB audio format encoding unit is coupled to the digital broadcast receiving unit for converting the digital audio signal into a USB audio signal. The USB hub is coupled to the USB audio format encoding unit and is adapted to be coupled to the host end for transmitting the USB audio signal to the host end, and receiving the USB control signal from the host end. The USB/serial transmission bus bridge unit is coupled to the USB hub and the digital broadcast receiving unit for converting the USB control signal that is transmitted from the USB hub into a serial transmission bus control signal, and subsequently transmitting the serial transmission bus control signal to the digital broadcast receiving unit.

In an embodiment of the invention, when the digital broadcast receiving unit supports a UART control signal, the USB/serial transmission bus bridge unit is a USB/UART bridge unit that converts the USB control signal into a UART control signal.

In an embodiment of the invention, when the digital broadcast receiving unit supports an I2C control signal, the USB/serial transmission bus bridge unit is a USB/I2C bridge unit that converts the USB control signal into an I2C control signal.

In an embodiment of the invention, when the digital broadcast receiving unit supports a SPI control signal, the USB/serial transmission bus bridge unit is a USB/SPI bridge unit that converts the USB control signal into a SPI control signal.

The digital broadcast signal can further include a non-audio signal. Therefore, in an embodiment of the invention, the digital broadcast receiving unit demodulates the digital broadcast signal so as to obtain the non-audio signal, and then transmits the non-audio signal to the USB/serial transmission bus bridge unit. The USB/serial transmission bus bridge unit converts the non-audio signal into a USB non-audio signal for subsequent transmission to the host end. The non-audio signal is one of a UART signal, an I2C signal, and a SPI signal.

In the present invention, the USB hub of the digital broadcast receiving device serves as a transmission interface with the host end. Through the USB audio format encoding unit, the digital audio signal that is outputted from the digital broadcast receiving unit is converted into the USB audio signal and transmitted to the USB hub. Through the USB/serial transmission bus bridge unit, the USB control signal from the host end is converted into a serial transmission bus control signal and is transmitted to the digital broadcast receiving unit, and the non-audio signal that is outputted from the digital broadcast receiving unit is converted into a USB non-audio signal and is transmitted to the host end through the USB hub. The present invention thus not only reduces a pin count of the transmission interface of the digital broadcast receiving device, but also enables convenient integration of the digital broadcast receiving device with the host end that is provided with such USB interface, thus making application of the digital broadcast receiving device simpler and more universal.

BRIEF DESCRIPTION OF THE DRAWINGS

Other features and advantages of the present invention will become apparent in the following detailed description of the preferred embodiment with reference to the accompanying drawings, of which:

FIG. 1 is a schematic circuit block diagram illustrating a preferred embodiment of a digital broadcast receiving device according to the present invention; and FIG. 2 is a table showing pin specifications of each input/output end transmission port of a USB hub of the preferred embodiment.

DETAILED DESCRIPTION OF THE PREFERRED EMBODIMENT

Referring to FIG. 1, the preferred embodiment of the digital broadcast receiving device 100 according to the present invention is adapted for receiving a digital broadcast signal, and accepting control from a universal serial bus (USB) control signal of a host end 2. The digital broadcast receiving device 100 demodulates the digital broadcast signal so as to obtain a digital audio signal corresponding to a channel frequency based on a selected frequency parameter in the USB control signal, and subsequently transmits the digital audio signal to the host end 2 for reproduction.

The host end 2 can be a digital television signal receiving device (a set-top-box), home sound system, car stereo, personal computer, notebook computer, portable media player (PMP), or another type of electronic device, and the digital broadcast receiving device 100 can be a modularized product that is built into the host end 2 and that is provided with a USB transmission interface, or a quick connect (PNP) USB dongle product. In addition, the host end 2 has a USB connector 20 for connecting to the digital broadcast receiving device 100, as shown in FIG. 1.

The digital broadcast receiving device 100 includes a digital broadcast receiving unit 10, a USB audio format encoding unit 11 coupled to the digital broadcast receiving unit 10, a USB hub 12 coupled to the USB audio format encoding unit 11 and coupled to the USB connector 20 of the host end 2, and a USB/serial transmission bus bridge unit 13 coupled to the digital broadcast receiving unit 10 and the USB hub 12.

The digital broadcast receiving unit 10 is adapted for receiving the digital broadcast signal, and preferably includes a tuner 101 coupled to a digital broadcast receiving antenna (not shown in the Figure), a decoder 102 coupled to the tuner 101, and a memory 103 coupled to the decoder 102.

The tuner 101 receives the digital broadcast signal (radio frequency signal) that is received by the digital broadcast receiving antenna, extracts a desired base frequency signal 105 from the digital broadcast signal based on a control command (SPI) (which contains the selected frequency parameter) originating from the decoder 102, and provides the base frequency signal 105 to the decoder 102. The decoder 102 performs decoding of the base frequency signal 105 so as to obtain a digital audio signal (DAC_I2S). The memory 103 includes SDRAM, EEPROM, Flash memory, etc. The SDRAM stores data decoded by the decoder 102, the EEPROM stores the selected frequency parameter, and the Flash memory stores associated software programs to be executed during operation of the decoder 102.

Since the USB connector 20 of the host end 2 only receives USB formatted signals, the USB signal format encoding unit 11, which is coupled to the decoder 102 of the digital broadcast receiving unit 10 in this embodiment, is used for converting the digital audio signal (DAC_I2S) into a USB audio signal, and outputting the USB audio signal to the USB hub 12.

The USB hub 12 has two input end transmission ports 121,122 and an output end transmission port 123. One of the input end transmission ports 121 is coupled to the USB audio signal format encoding unit 11, and the other one of the input end transmission ports 122 is coupled to the USB/serial transmission bus bridge unit 13. The output end transmission port 123 is coupled to the USB connector 20 of the host end 2. Pin specifications of each of the transmission ports 121,122,123 are shown in FIG. 2.

The USB hub 12 transmits the USB audio signal that is outputted from the USB audio format encoding unit 11 from the input end transmission port 121 to the output end transmission port 123, and from the output end transmission port 123 to the host end 2 via the USB connector 20. The USB hub 12 also receives the USB control signal that is transmitted via the USB connector 20 of the host end 2 through the output end transmission port 123 and transmits the USB control signal to the input end transmission port 122 for output to the USB/serial transmission bus bridge unit 13.

Since the decoder 102 of the digital broadcast receiving unit 10 only receives serial transmission bus signals, the USB/serial transmission bus bridge unit 13, which is coupled to the decoder 102 of the digital broadcast receiving unit 10 in this embodiment, converts the USB control signal that is transmitted from the USB hub 12 into a serial transmission bus control signal, and then transmits the serial transmission bus control signal to the decoder 102.

In this embodiment, the USB/serial transmission bus bridge unit 13 is a USB/UART (Universal Asynchronous Receiver-Transmitter) bridge unit, and therefore converts the USB control signal into a UART control signal. However, the USB/serial transmission bus bridge unit 13 can be realized in accordance with a signal format supported by the decoder 102, such as an I2C (Inter-Integrated Circuit) signal format or a SPI (Serial Peripheral Interface) signal format. The USB/serial transmission bus bridge unit 13 can thus be a USB/I2C bridge unit that converts the USB control signal into an I2C control signal, or a USB/SPI bridge unit that converts the USB control signal into a SPI control signal.

Moreover, the digital broadcast signal can further include a non-audio signal that is transmitted at the same time as the digital audio signal, and that includes digital information such as health advisories, weather conditions, road conditions, or breaking news to be reproduced through a display device (not shown) of the host end 2.

Therefore, when the digital broadcast signal includes the non-audio signal, the decoder 102 of the digital broadcast receiving unit 10 performs decoding of the base frequency signal 105 that is transmitted by the tuner 101 so as to obtain the non-audio signal, which can have a UART, I2C, or SPI serial transmission bus format, and then transmits the non-audio signal to the USB/serial transmission bus bridge unit 13. The USB/serial transmission bus bridge unit 13 converts the non-audio signal into a USB non-audio signal, and transmits the USB non-audio signal to the input end transmission port 122 of the USB hub 12. The USB hub 12 then transmits the non-audio signal to the host end 2.

In this embodiment, a USB related processing circuit is installed in the digital broadcast receiving device 100, and through particular USB-related signal processing procedures, USB signal conversion operations are possible without additional consideration of host end conditions, such as a disposition of host end circuits, and the twenty-one pin connector board required in the prior art may be omitted.

In sum, the USB hub 12 of the digital broadcast receiving device 100 serves as a transmission interface with the host end 2. Through the USB audio format encoding unit 11, the digital audio signal (DAC_I2C) that is outputted from the digital broadcast receiving unit 10 is converted into the USB audio signal and transmitted to the USB hub 12. Through the USB/serial transmission bus bridge unit 13, the USB control signal from the host end 2 is converted into a serial transmission bus control signal and is transmitted to the digital broadcast receiving unit 10, and the non-audio signal that is outputted from the digital broadcast receiving unit 10 is converted into a USB non-audio signal and is transmitted to the host end 2 through the USB hub 12. The present invention thus not only reduces a pin count of the transmission interface of the digital broadcast receiving device 100, but also enables convenient integration of the digital broadcast receiving device 100 with the host end 2, thus making application of the digital broadcast receiving device 100 simpler and more universal.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A signal transmission interface adapted for transmitting a digital audio signal that originates from a digital broadcast receiving end and a USB control signal that originates from a host end, said signal transmission interface comprising:
    a USB audio format encoding unit adapted to be coupled to the digital broadcast receiving end, for converting the digital audio signal into a USB audio signal;
    a USB hub coupled to said USB audio format encoding unit and adapted to be coupled to the host end, for transmitting said USB audio signal to the host end and receiving the USB control signal that originates from the host end; and
    a USB/serial transmission bus bridge unit coupled to said USB hub and adapted to be coupled to the digital broadcast receiving end, for converting said USB control signal that is transmitted from said USB hub into a serial transmission bus control signal, and transmitting said serial transmission bus control signal to the digital broadcast receiving end.

2. The signal transmission interface as claimed in claim 1, wherein said serial transmission bus control signal is one of a DART control signal, an I2C control signal and a SPI control signal.

3. The signal transmission interface as claimed in claim 1, the digital audio signal being included in a digital broadcast signal that is received by the digital broadcast receiving end, the digital broadcast signal further including a non-audio signal, wherein
    said USB/serial transmission bus bridge unit receives the non-audio signal that is outputted from the digital broadcast receiving end, and converts the non-audio signal into a USB non-audio signal for subsequent transmission to the host end.

4. The signal transmission interface as claimed in claim 3, wherein the non-audio signal is one of a UART signal, an I2C signal, and a SPI signal.

5. The signal transmission interface as claimed in claim 1, wherein said USB hub has two input end transmission ports and an output end transmission port,
    one of said two input end transmission ports being coupled to said USB audio format encoding unit for receiving said USB audio signal and transmitting said USB audio signal to said output end transmission port,
    the other one of said two input end transmission ports being coupled to said USB/serial transmission bus bridge unit for transmitting the USB control signal from the host end to said USB/serial transmission bus bridge unit, and
    said output end transmission port being adapted to be coupled to the host end for receiving the USB control signal from the host end and transmitting the USB control signal to the other one of said two input end transmission ports, and transmitting said USB audio signal to the host end.

6. The signal transmission interface as claimed in claim 3, wherein said USB hub has two input end transmission ports and an output end transmission port,
    one of said two input end transmission ports being coupled to said USB audio format encoding unit for receiving said USB audio signal and transmitting said USB audio signal to said output end transmission port,
    the other one of said two input end transmission ports being coupled to said USB/serial transmission bus bridge unit for transmitting the USB control signal from the host end to said USB/serial transmission bus bridge unit, and transmitting said USB non-audio signal from said USB/serial transmission bus bridge unit to said output end transmission port, and said output end transmission port being adapted to be coupled to the host end for receiving the USB control signal from the host end and transmitting the USB control signal to the other one of said two input end transmission ports, and transmitting said USB audio signal and said USB non-audio signal to the host end.

7. A digital broadcast receiving device adapted for receiving a digital broadcast signal, and accepting control fro a USB control signal of a host end, said digital broadcast receiving device comprising:
    a digital broadcast receiving unit adapted for receiving the digital broadcast signal and demodulating the digital broadcast signal so as to obtain a digital audio signal included therein;
    a USB audio format encoding unit coupled to said digital broadcast receiving unit for converting the digital audio signal into a USB audio signal;
    a USB hub coupled to said USB audio format encoding unit and adapted to be coupled to the host end, for transmitting said USB audio signal to the host end, and receiving the USB control signal from the host end; and
    a USB/serial transmission bus bridge unit coupled to said USB hub and said digital broadcast receiving unit, for converting the USB control signal that is transmitted from said USB hub into a serial transmission bus control signal, and subsequently transmitting said serial transmission bus control signal to said digital broadcast receiving unit.

8. The digital broadcast receiving device as claimed in claim 7, wherein said serial transmission bus control signal is one of a UART control signal, an I2C control signal and a SPI control signal.

9. The digital broadcast receiving device as claimed in claim 7, the digital broadcast signal further including a non-audio signal, wherein
said digital broadcast receiving unit demodulates the digital broadcast signal so as to obtain the non-audio signal and transmits the non-audio signal to said USB/serial transmission bus bridge unit, said USB/serial transmission bus bridge unit converting the non-audio signal into a USB non-audio signal for subsequent transmission to the host end.

10. The digital broadcast receiving device as claimed in claim 9, wherein the non-audio signal is one a UART signal, an I2C signal and a SPI signal.

11. The digital broadcast receiving device as claimed in claim 7, wherein said USB hub has two input end transmission ports and an output end transmission port,
one of said two input end transmission ports being coupled to said USB audio format encoding unit for receiving said USB audio signal and transmitting said USB audio signal to said output end transmission port,
the other one of said two input end transmission ports being coupled to said USB/serial transmission bus bridge unit for transmitting the USB control signal from the host end to said USB/serial transmission bus bridge unit, and
said output end transmission port being adapted to be coupled to the host end for receiving the USB control signal from the host end and transmitting the USB control signal to the other one of said two input end transmission ports, and transmitting said USB audio signal to the host end.

12. The digital broadcast receiving device as claimed in claim 9, wherein said USB hub has two input end transmission ports and an output end transmission port,
one of said two input end transmission ports being coupled to said USB audio format encoding unit for receiving said USB audio signal and transmitting said USB audio signal to said output end transmission port,
the other one of said two input end transmission ports being coupled to said USB/serial transmission bus bridge unit for transmitting the USB control signal from the host end to said USB/serial transmission bus bridge unit, and transmitting said USB non-audio signal from said USB/serial transmission bus bridge unit to said output end transmission port, and
said output end transmission port being adapted to be coupled to the host end for receiving the USB control signal from the host end and transmitting the USB control signal to the other one of said two input end transmission ports, and transmitting said USB audio signal and said USB non-audio signal to the host end.

13. The digital broadcast receiving device as claimed in claim 8, wherein said digital broadcast receiving unit demodulates the digital broadcast signal based on said serial transmission bus control signal so as to obtain the corresponding digital audio signal.

14. A digital broadcast receiving device adapted for receiving a digital broadcast signal, and accepting control from a USB control signal of a host end, said digital broadcast receiving device comprising:
a USB audio format encoding unit for converting a digital audio signal into a USB audio signal;
a USB hub coupled to said USB audio format encoding unit and adapted to be coupled to the host end for transmitting said USB audio signal to the host end, and receiving the USB control signal from the host end;
a USB/serial transmission bus bridge unit coupled to said USB hub for converting the USB control signal transmitted from said USB hub into a serial transmission bus control signal; and
a digital broadcast receiving unit coupled to said USB audio format encoding unit and said USB/serial transmission bus bridge unit, for demodulating the digital broadcast signal based on said serial transmission bus control signal so as to obtain the digital audio signal included in the digital broadcast signal.

15. The digital broadcast receiving device as claimed in claim 14, wherein said digital broadcast receiving unit includes a decoder and a tuner, said decoder converting said serial transmission bus control signal into a control command, said tuner extracting a base frequency signal from the digital broadcast signal based on said control command, and providing the base frequency signal to said decoder, said decoder performing decoding of the base frequency signal so as to obtain the digital audio signal.

* * * * *